(12) United States Patent
Britvan

(10) Patent No.: US 10,085,594 B1
(45) Date of Patent: Oct. 2, 2018

(54) BBQ INCORPORATING FLIP DOWN LATCHED VENT AND GRILL CLEANING PLATE

(71) Applicant: Jack J. Britvan, Jericho, NY (US)

(72) Inventor: Jack J. Britvan, Jericho, NY (US)

( * ) Notice: Subject to any disclaimer, the term of this patent is extended or adjusted under 35 U.S.C. 154(b) by 792 days.

(21) Appl. No.: 14/543,491

(22) Filed: Nov. 17, 2014

(51) Int. Cl.
*A47J 37/00* (2006.01)
*A47J 37/07* (2006.01)

(52) U.S. Cl.
CPC ....... *A47J 37/0786* (2013.01); *A47J 37/0704* (2013.01)

(58) Field of Classification Search
CPC .............. A47J 37/0786; A47J 37/0704; F23D 2207/00
USPC ............................................. 126/25 R, 41 R
See application file for complete search history.

(56) References Cited

U.S. PATENT DOCUMENTS

| | | | |
|---|---|---|---|
| 4,240,398 A | 12/1980 | Lindop | |
| 5,437,222 A * | 8/1995 | Franklin | A47J 33/00 126/25 R |
| 5,605,143 A | 2/1997 | Herbert et al. | |
| 5,836,298 A * | 11/1998 | Grady | A47J 37/0704 126/276 |
| 6,182,560 B1 * | 2/2001 | Andress | A47J 37/0718 126/25 R |
| 6,431,165 B1 * | 8/2002 | Dow | A21B 3/16 126/25 R |
| 7,168,363 B1 * | 1/2007 | Brown | A47J 37/0786 126/25 R |
| D685,555 S | 7/2013 | Kehler et al. | |
| 2013/0340741 A1 * | 12/2013 | Kahler | A47J 37/0786 126/25 R |

* cited by examiner

*Primary Examiner* — Avinash Savani
*Assistant Examiner* — Rabeeul Zuberi
(74) *Attorney, Agent, or Firm* — Thomas A. O'Rourke; Bodner & O'Rourke, LLP

(57) ABSTRACT

A barbeque stove having a firebox, a firebox hood forming smoke chamber incorporating at least one flip down vent providing means for vary the stove cooking temperature during a stove cooking session and a cleaning plate movable from a stove housing storage receptacle into the flip down vent overlaying the stove grill that will sufficiently concentrate the stove heat about the barbeque grill to incinerate food residue thereon with the firebox and/or hood providing flanges for supporting the grill cleaning sheet.

9 Claims, 12 Drawing Sheets

BBQ INCORPORATING FLIP DOWN LATCHED VENT AND GRILL CLEANING PLATE

BACKGROUND OF THE INVENTION

Field of the Invention

The present invention relates generally to stoves and, more specifically, to outdoor stoves incorporating a firebox and a firebox hood providing a latched vent for both varying the stove cooking temperature and for inserting a grill cleaning plate into said latched vent to trap and concentrate heat about the stove grill to incinerate food residue on the grill.

Description of the Prior Art

There are other barbeque stoves which provide device for cleaning barbeque grills. While these grill cleaners may be suitable for the purposes for which they where designed, they would not be as suitable for the purposes of the present invention as heretofore described.

It is thus desirable to provide a barbeque stove housing having a firebox, a firebox hood forming smoke chamber incorporating a flip down vent providing means for vary the stove cooking temperature during a stove cooking session and a cleaning plate movable from a stove housing storage receptacle into the flip down vent overlaying the stove grill to trap heat during a grill cleaning session.

It is further desirable to provide the barbeque stove grill cleaning plate that is positionable over the grill and spaced away therefrom so that the firebox heat will be sufficiently concentrated about the barbeque grill to incinerate food residue thereon with the firebox and/or hood providing flanges for supporting the grill.

SUMMARY OF THE PRESENT INVENTION

A primary object of the present invention is to provide a barbeque stove having a firebox and a firebox hood forming a heat/smoke plenum and a cleaning plate removably stored within a stove housing receptacle with the hood incorporating at least one flip down vent.

Another object of the present invention is to provide a barbeque stove wherein said hood vent provides means for varying the stove internal cooking temperature by selectively opening the vent during a cooking session.

Yet another object of the present invention is to provide a barbeque stove wherein said hood vent provides means for partitioning the heat plenum by selectively opening the vent and inserting the cleaning plate that will then concentrate the heat below the cleaning plate.

Still yet another object of the present invention is to provide a barbeque stove having a cleaning plate positionable over the barbeque grill to increase the temperature about the grill to incinerate food residue therefrom.

An additional object of the present invention is to provide a barbeque stove with a cleaning plate receptacle for storage of the cleaning plate when not used.

A further object of the present invention is to provide said barbeque stove cleaning sheet with heat resistant handles.

A yet further object of the present invention is to provide said barbeque stove firebox with flanges for supporting the cleaning plate a predetermined distance above the barbeque grill.

A still yet further object of the present invention is to provide said barbeque stove hood with flanges for supporting the cleaning plate a predetermined distance above the barbeque grill.

Another object of the present invention is to provide a barbeque stove providing a cleaning sheet that optionally provides legs for supporting the cleaning sheet above the barbeque grill.

Yet another object of the present invention is to optionally provide said barbeque stove hood with means for mounting a deployable rolled thermal sheet to the stove hood having hood opposing side fasteners for holding the thermal sheet in a deployed state that serves similar function as the cleaning plate.

Additional objects of the present invention will appear as the description proceeds.

The present invention overcomes the shortcomings of the prior art by providing a barbeque stove housing having a firebox and a smoke chamber formed by the hood having an integral flip down vent for varying the cooking temperature. Also provided is a burn off cleaning plate that is positionable over the grill and spaced above it so that the firebox heat will be concentrated about the barbeque grill sufficiently to incinerate any food residue. The cleaning plate may also be inserted into the integral hood flip down vent to concentrate the heat within the partitioned hood. A stove receptacle is also provided for storing the grill cleaning plate and a hatch for inserting the grill cleaning sheet above the grill with the firebox having flanges for supporting the cleaning sheet a predetermined distance above the barbeque grill. The grill cleaning sheet optionally includes legs of a predetermined length whereby the cleaning sheet can be positioned on the grill without the need of firebox support flanges.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures.

10 conventional barbeque
12 grill body member
14 food residue
16 conventional hood interior
18 barbeque stove of the present invention
20 burnoff plate
22 burnoff plate storage receptacle
24 burnoff plate support flanges
26 grill hood 28 grill hood hinges
30 grill hood interior
32 grill hood exterior
34 burnoff plate insertion slot
36 burnoff plate insertion slot flap
38 firebox front side
40 firebox lateral sides
42 firebox rear side
44 grill burners
46 high heat area
48 novel grill interior
50 lower heat area
52 firebox inside wall
54 firebox outside wall
56 burnoff plate legs
58 firebox
60 hood vent/insertion slot
62 burnoff plate handles
64 hood insertion slot
66 hood insertion slot flap
68 hood mounted support flanges
72 burnoff roller
74 burnoff roller material
46 burnoff roller hooks
A1 burnoff roller material directional arrow

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
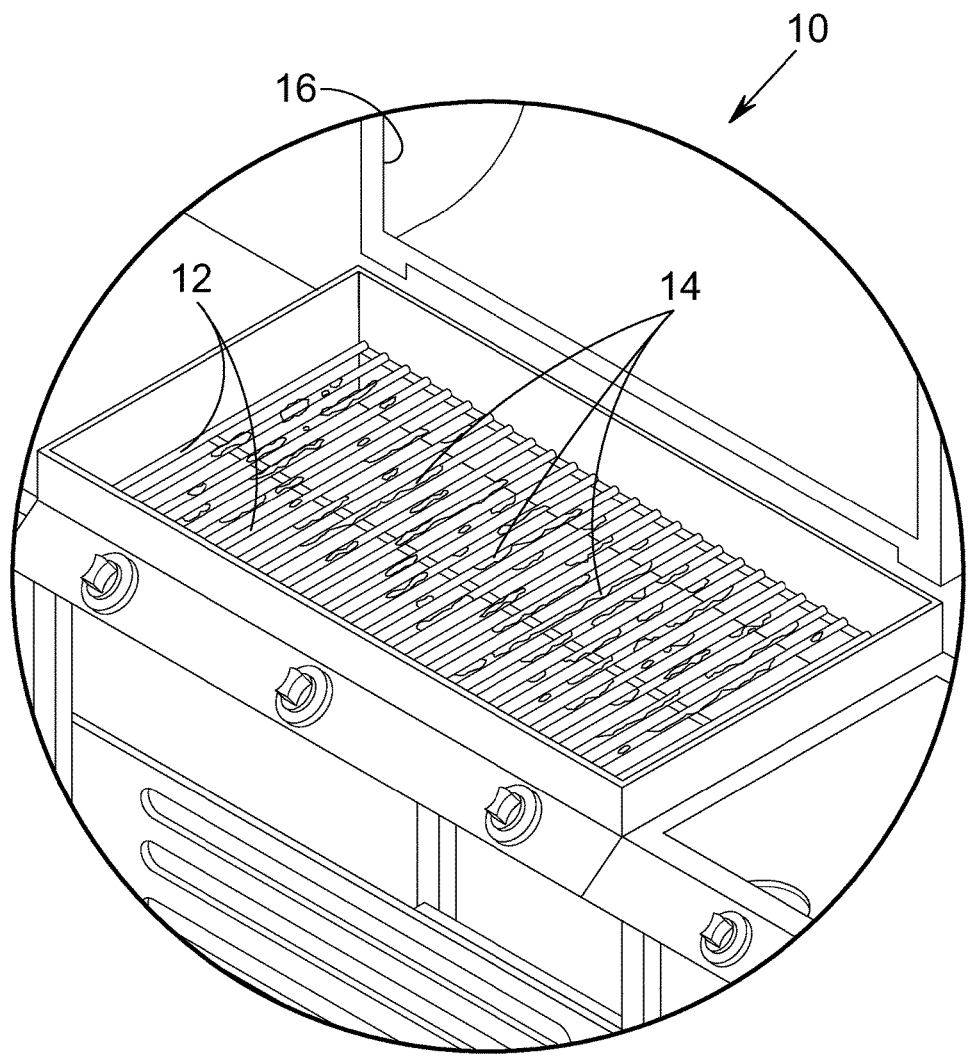
FIG. 1 is an illustrative view of the prior art.

Referring to FIG. 1, shown is an illustrative view of prior art. A problem with barbecue grills is cleaning: especially that of the built-up residue that remains on the grill grid from cooking foods. The residue 14 tends to remain on the grill surface or fall within the grill, onto the burners, creating a mess. The present invention over comes this problem by providing a high heat burn off plate and means to insert it so that the residue is cooked off. Shown in the Figure is a conventional grill 10 with the grill body or grid indicated at 12 and the food residue left over indicated at 14. Also seen in the Figure is the conventional grill hood interior at 16.

Figure 2:
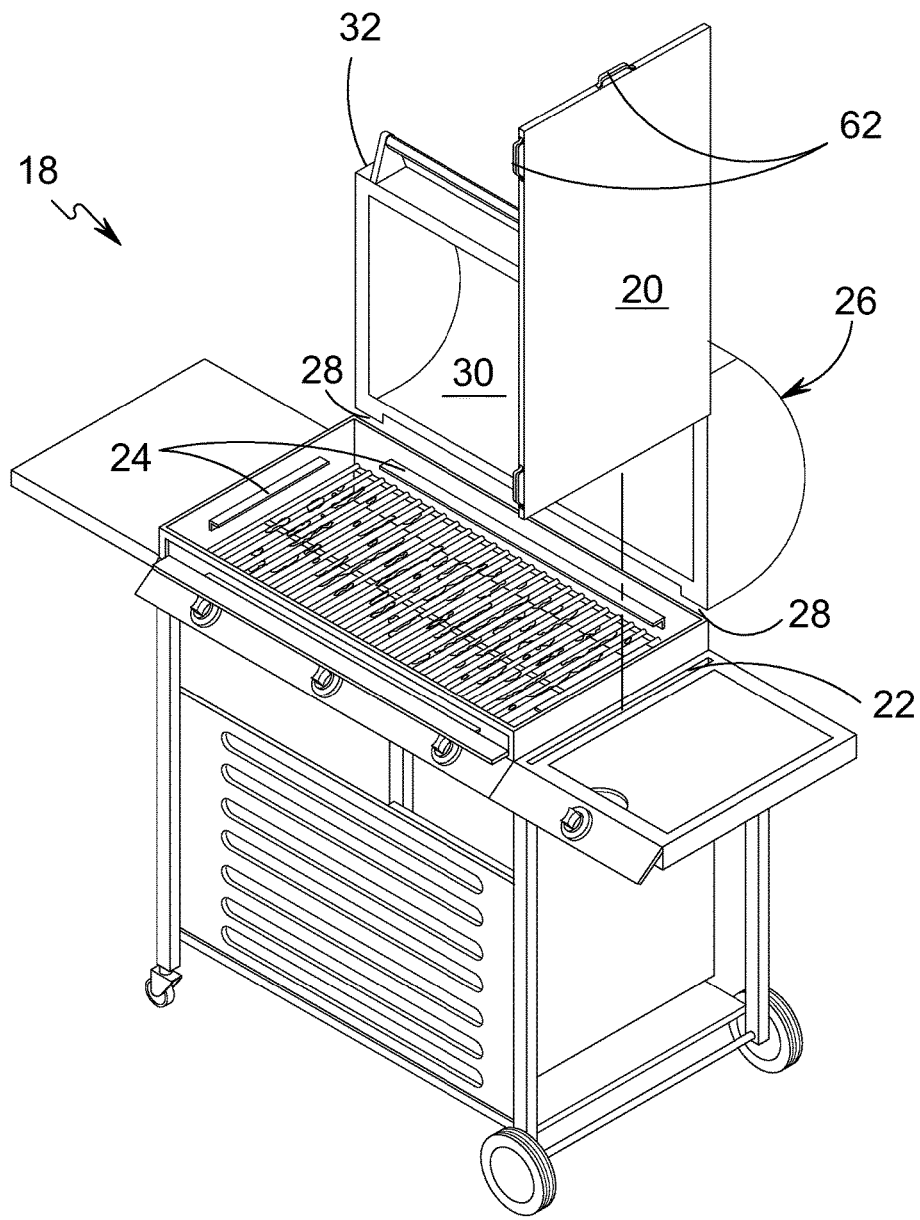
FIG. 2 is an illustrative view of the present invention with the high-heat burnoff plate removed from the receptacle in the stove housing and also showing the supporting flanges in the stove body.

Referring to FIG. 2, shown is an illustrative view of the barbeque stove of the instant invention indicated at 18. The barbeque stove 18 includes a burnoff plate 20 incorporating a pair of handles indicated at 62. Burnoff plate 20 is seen here removed from its receptacle 22 located in the side of the body of barbeque stove 18. Also shown in the Figure are the fire box supports or flanges 24 for suspending the high heat burnoff plate above the barbeque grill, preferably at the height of approximately one inch, thereby trapping heat that is used to raise the temperature of the grill member itself to incinerate any caked-on food residue. For this purpose, it should be understood that the burnoff plate would be constructed from an appropriate material with an appropriate amount of heat conductivity or reflection. Cast Iron, copper, aluminum, or a copper/aluminum mixture could be used, for example. Also provided is a flip-down opening vent and this vent will be shown and discussed in detail further hereinbelow. Additionally shown in the present Figure are the grill hood interior 30, the hood exterior 32, and the hood hinges 28.

Figure 3:
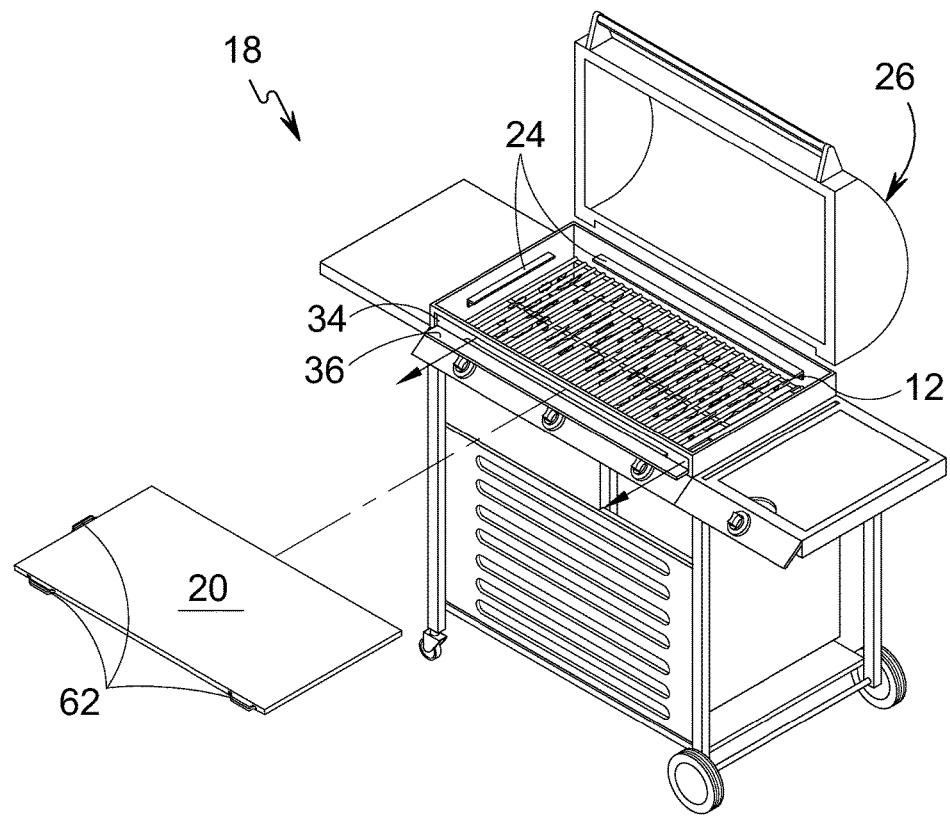
FIG. 3 is an illustrative perspective view of the present invention with the high heat burnoff plate in position to be inserted into the front insertion slot directly above the grill surface.

Turning now to FIG. 3, shown is an illustrative view of the high heat burnoff plate 20 ready to be placed through the burnoff plate insertion slot 34 to rest on the support flanges 24 thereby concentrating the heat from the firebox onto the grill body 12, and incinerate any food residue 14 caked thereon. To hold the heat in during cooking, the insertion slot 34 includes a flap indicated at 36.

Figure 4:
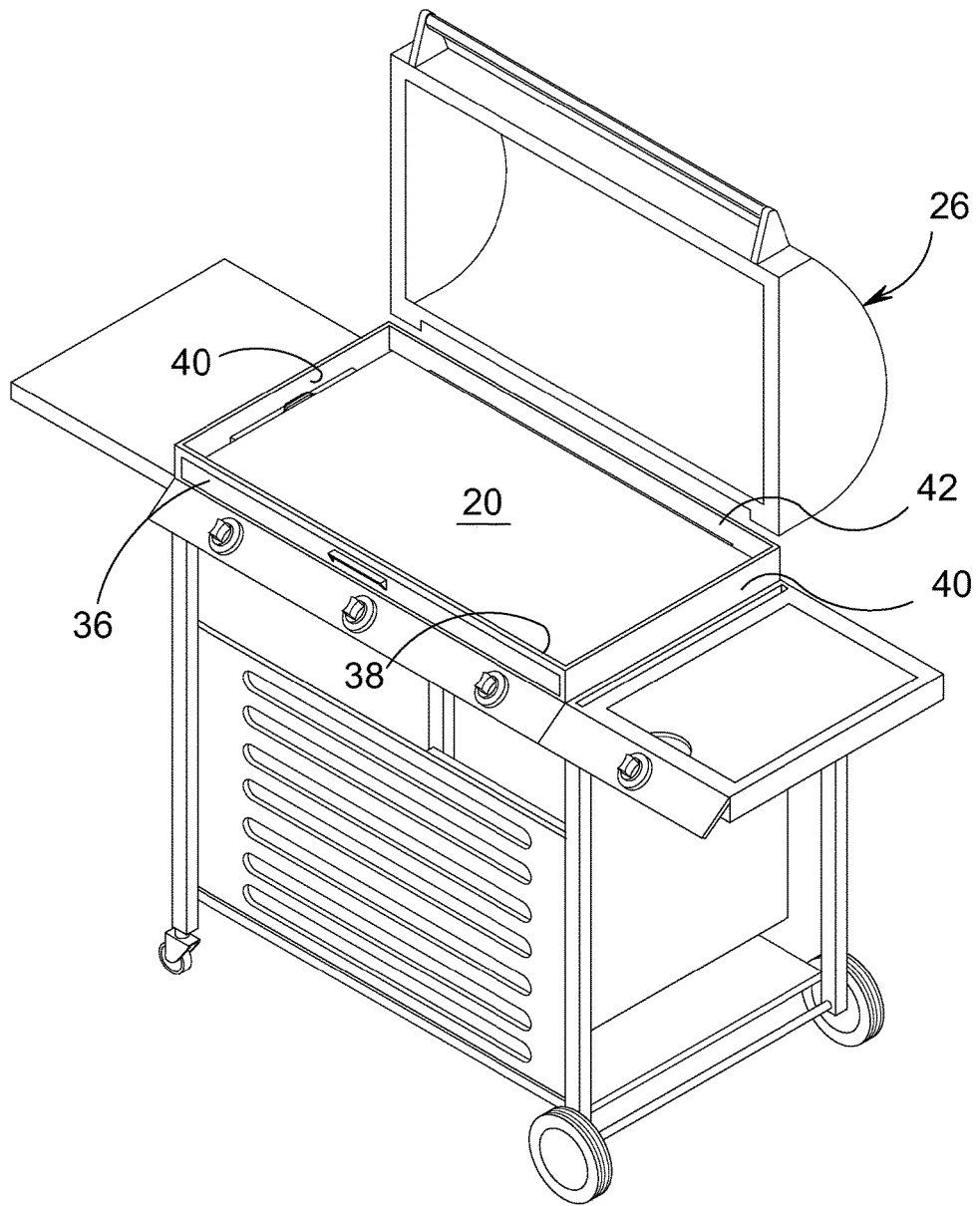
FIG. 4 is an illustrative perspective view of the present invention with the high heat burnoff plate in place.

Referring to FIG. 4, shown is an illustrative view of the barbeque stove incorporating the high heat burnoff plate in use. As can be seen in the Figure, the firebox includes a front side 38, two lateral sides 40 and a rear side 42. Barbecue maintenance and cleaning takes up a lot of time, removing residue using a brush, washing the grill and removal of residues that fall within the unit is time consuming. The high heat burn off plate 20 of the present invention accelerates the cleaning process by trapping heat about the barbeque grill element 12 rather than having to heat the interior of the hollow, dome-like hood 26.

Figure 5:
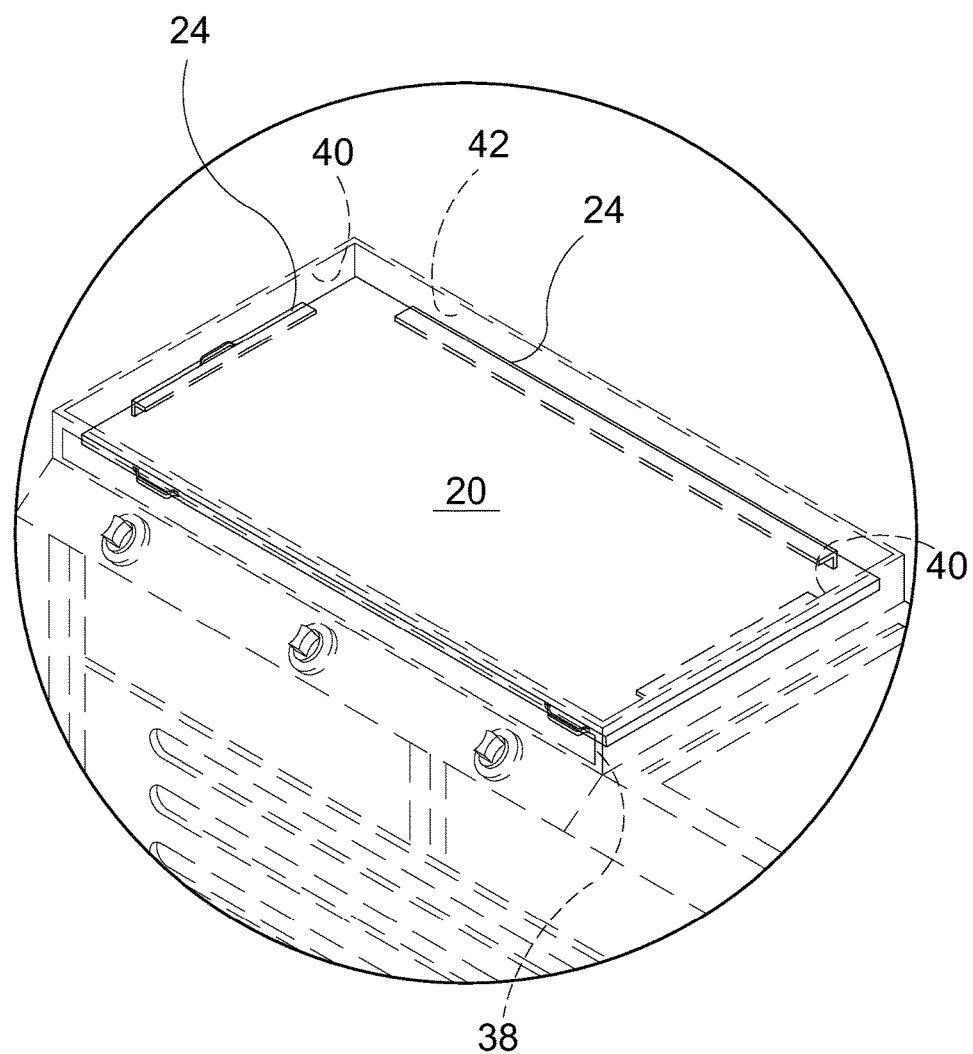
FIG. 5 is another illustrative view of the high heat burnoff plate in use.

Referring to FIG. 5, shown is an illustrative view of the high heat burnoff plate 20 in use. The high heat burnoff plate 20 is designed to substantially divide the area within the firebox to a high heat area below the high heat burnoff plate 20 by dimensioning the plate to substantially cover the interior space over the barbeque grill element.

Figure 6A:
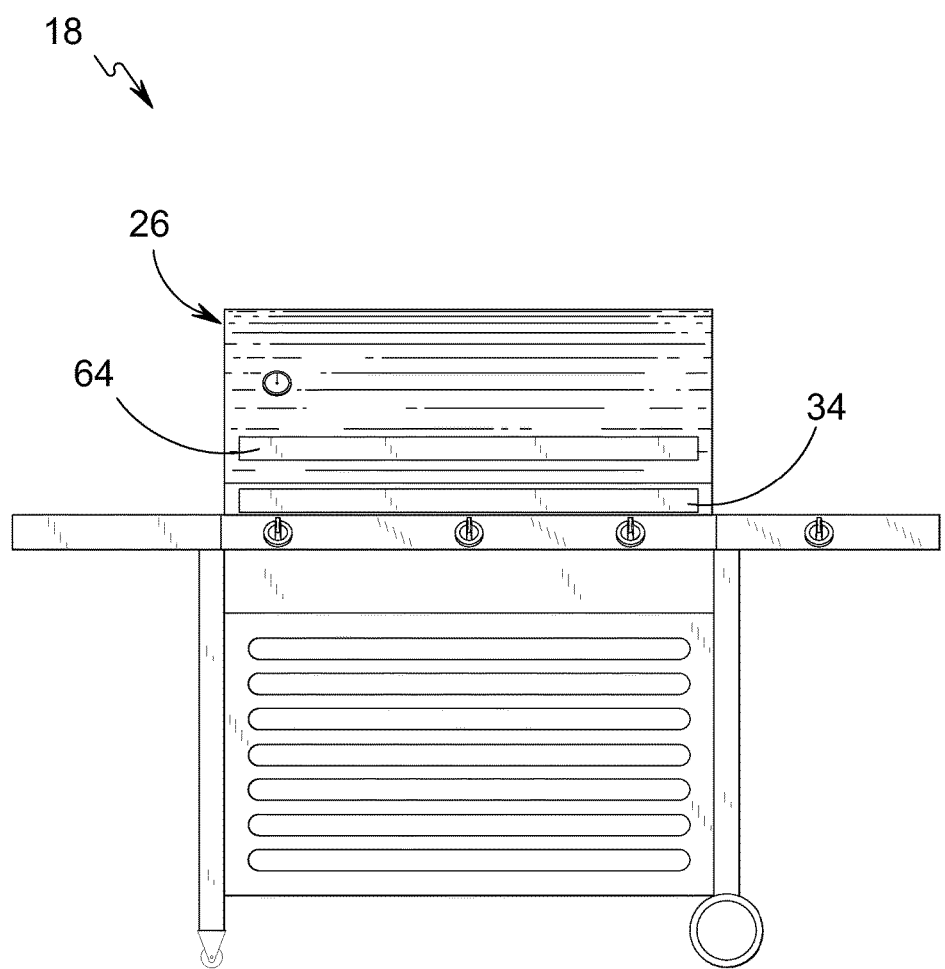
FIG. 6A is a front view of the present invention showing both the burnoff plate insertion slot proximate the firebox of the stove, and also the hood insertion slot contemplated in another embodiment of the invention.

Turning Now to FIG. 6A the present invention 18 is seen with hood 26 closed. In this front view the embodiment of the invention shown includes a hood insertion slot 64 for the burnoff plate 20 in addition to the insertion slot 34 located proximate the firebox and grill body (seen in other FIGS.). It should be noted that either the single burnoff plate 20 could be variously inserted into one or the other (slot 34 or slot 64) or that a pair of burnoff plates could be utilized.

Figure 6B:
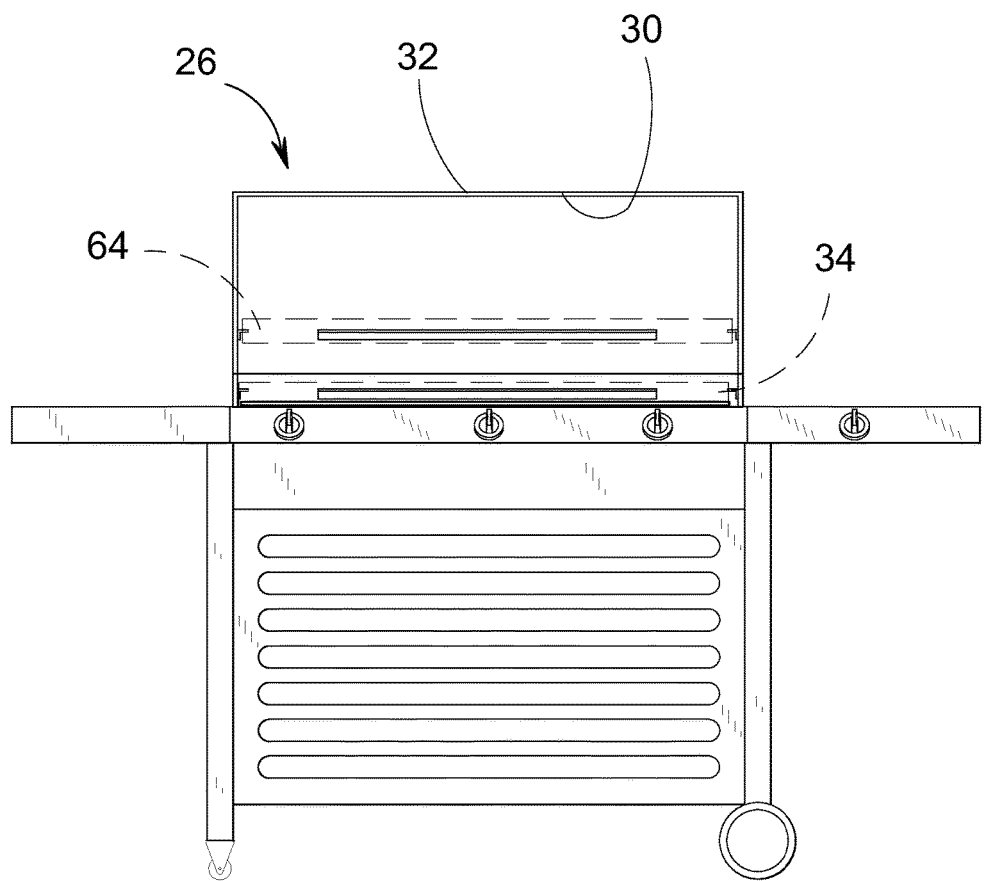
FIG. 6B is a partial sectional view showing both of the plates inserted.

In FIG. 6B a partial sectional front view of the present invention is seen. Note the first plate insertion slot 34 located over the grill body (not specifically seen in this Figure) and the second, hood mounted insertion slot 64.

Figure 6C:
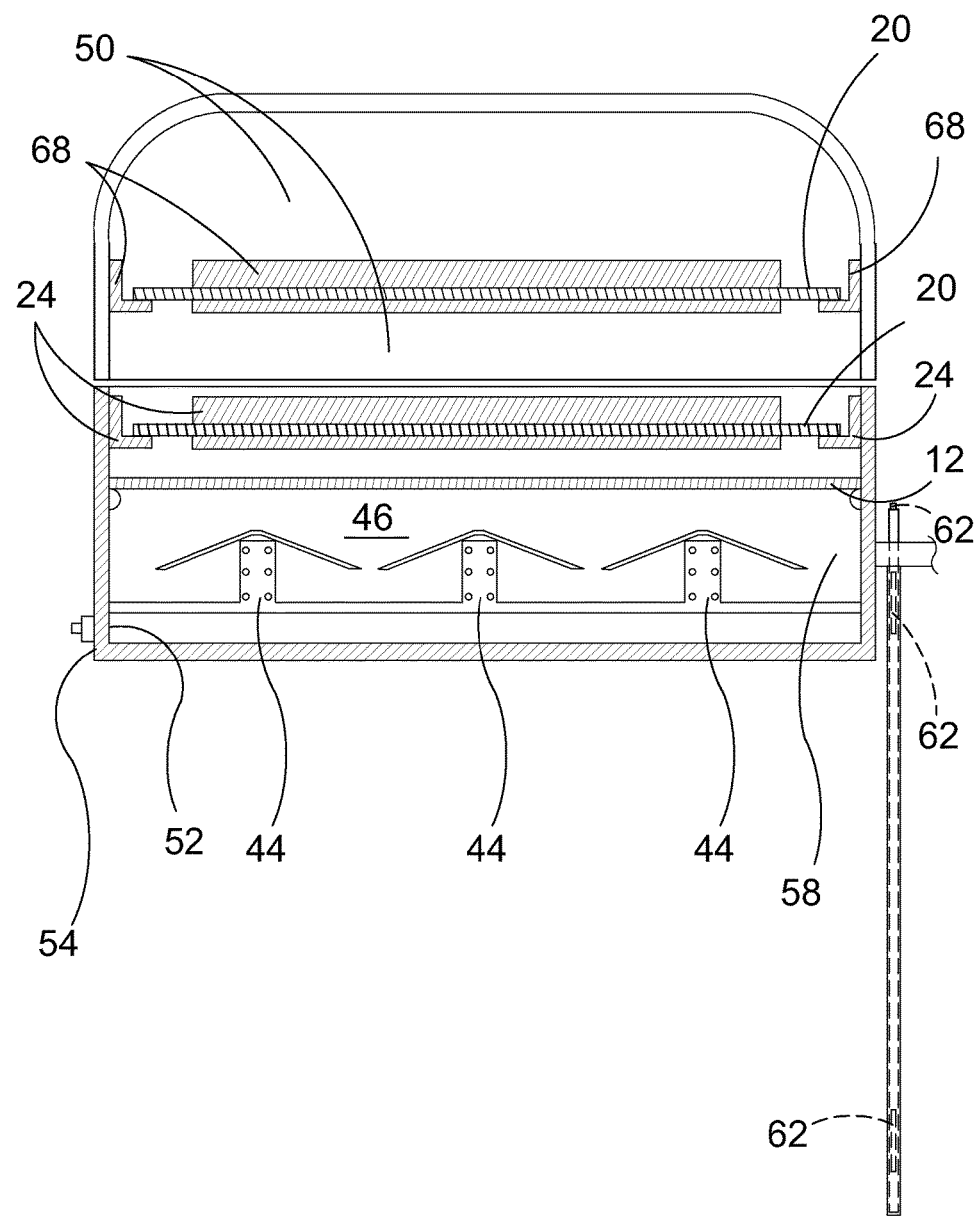
FIG. 6C is a cutaway view similar to FIG. 6B specifically showing the hood mounted support flanges.

FIG. 6C clearly shows the grill burners 44, the high heat area 46 located between the burnoff plate 20 and the burners 44, and the lower heat area 50 located between the burnoff plate 20 and the novel grill hood interior 48. Alternately shown is the burnoff plate inserted into the interior of the hood 26 through hood insertion slot 64 and is supported by the hood mounted support flanges indicated at 68. Also seen in the Figure are the firebox area 58, the firebox inner wall 52 and the firebox outer wall 54.

Figure 7:
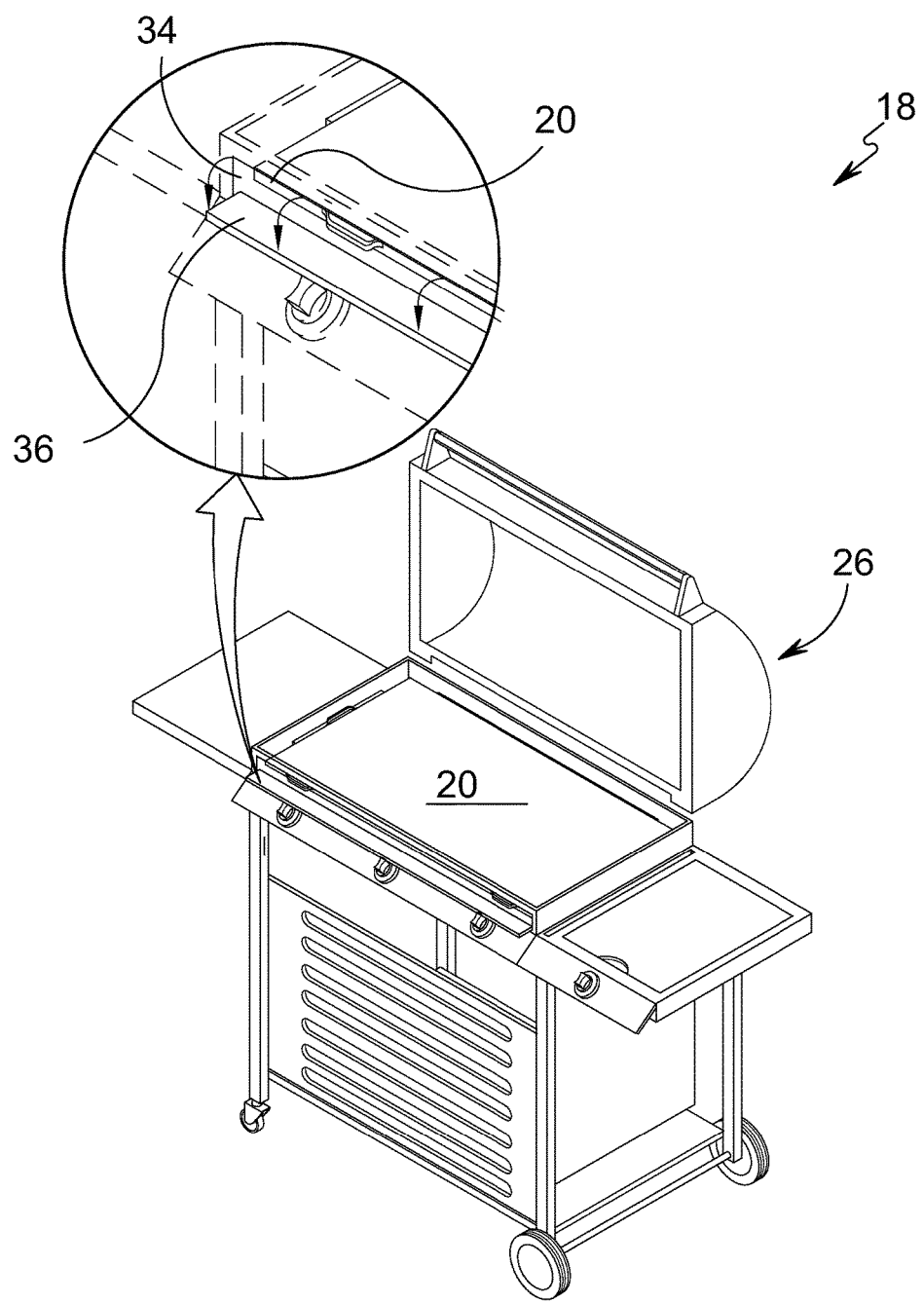
FIG. 7 is a detailed view of the present invention, showing the details of the insertion slot and flap.

Referring to FIG. 7 another illustrative view of the present invention is seen. In the exploded section of the Figure, the burnoff plate 20 can be seen placed into the insertion slot 34 to rest on burnoff plate support flanges 24 so that the plate 20 is located approximately one inch above the grill surface 12. Access to insertion slot 34 is provided by insertion slot flap 36, seen in the Figure. It should be emphasized that in the case of the hood insertion slot being present (in the case of certain embodiments), a similar flap would be associated with it. It should be noted that it is contemplated that even more additional insertion slots could be provided; for example, one or more could be located in other areas of the grill hood 26, providing access to the interior 30. This slot could be used to further control the heat and/or ventilation within the hood 26 and over the grill portion 12.

Figure 8A:
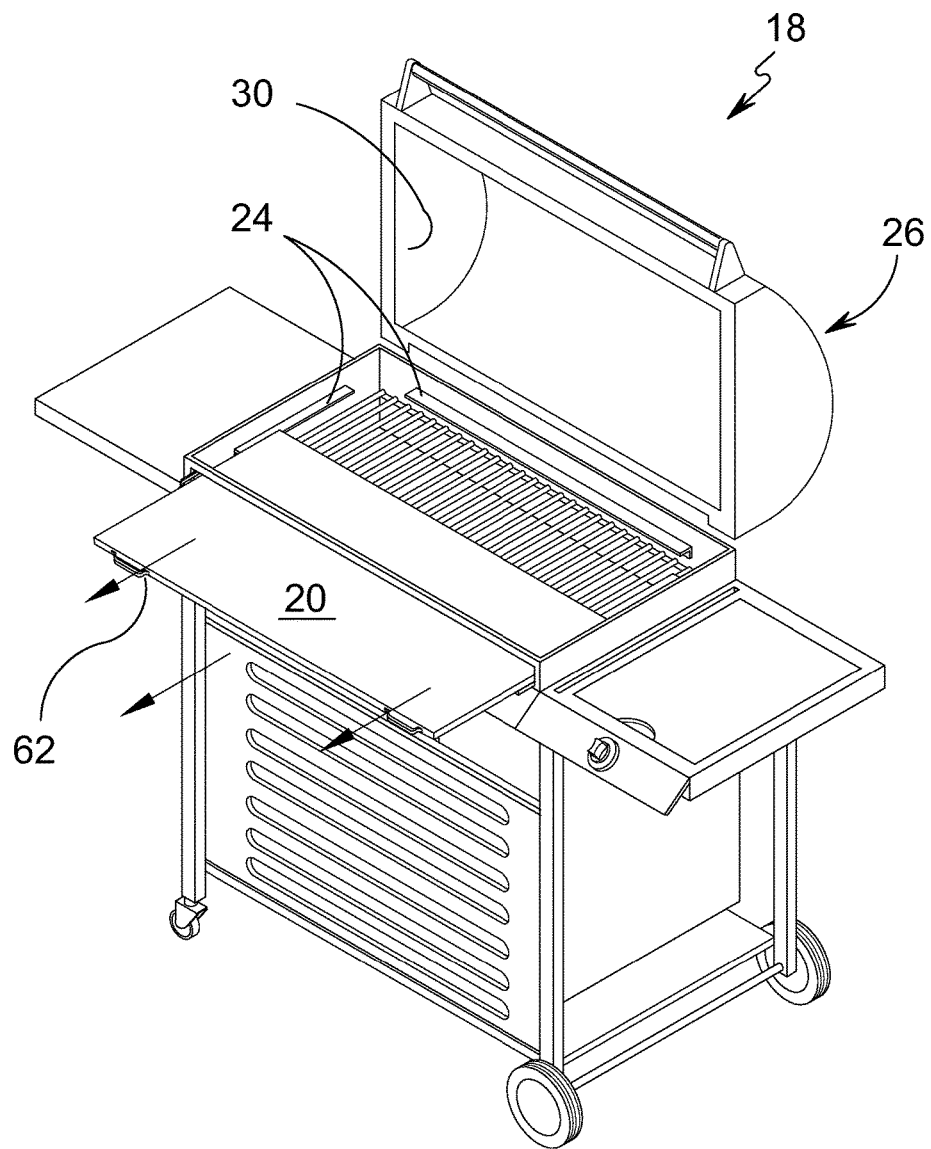
FIG. 8A is a perspective view of the burnoff plate being removed from the insertion slot from its position over the grill surface.

FIG. 8A shows the burnoff plate 20 being removed from the insertion slot 34.

Figure 8B:
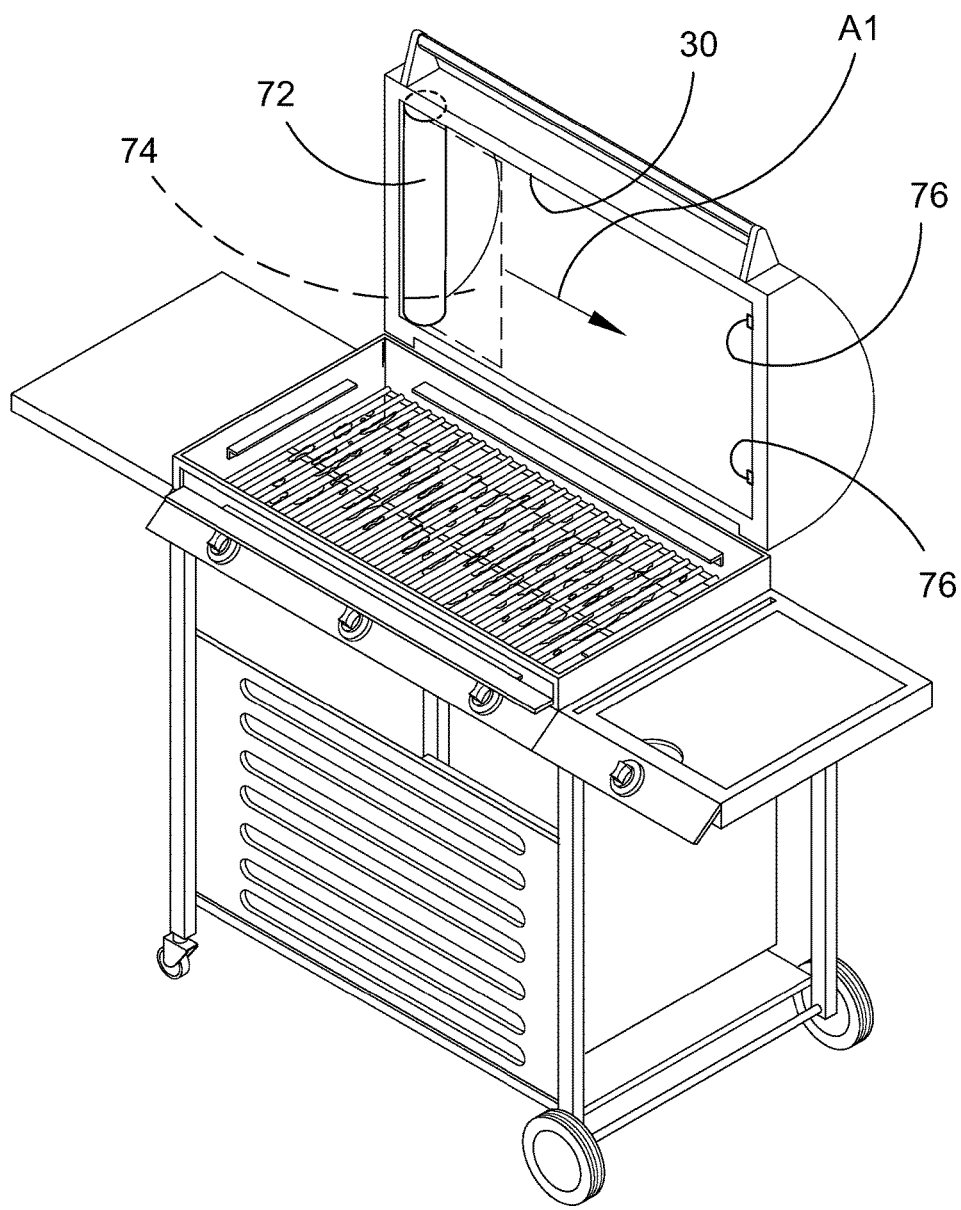
FIG. 8B is a perspective view of the present invention in another embodiment where the burnoff plate is replaced with a roller sheet of heat-reflective material.

FIG. 8B illustrates another alternative embodiment of the present invention. In this embodiment a burnoff roller 72 is located within grill hood 26. Burnoff roller material 74 is extended in the direction as indicated by arrow A1 and burnoff roller hooks 76 could be provided to secure the material 74 in the desired position. Roller material 74 would be made up of some heat reflective material as circumstances dictate and the roller material 74 could be either replaceable, renewable, or permanent.

Figure 9:
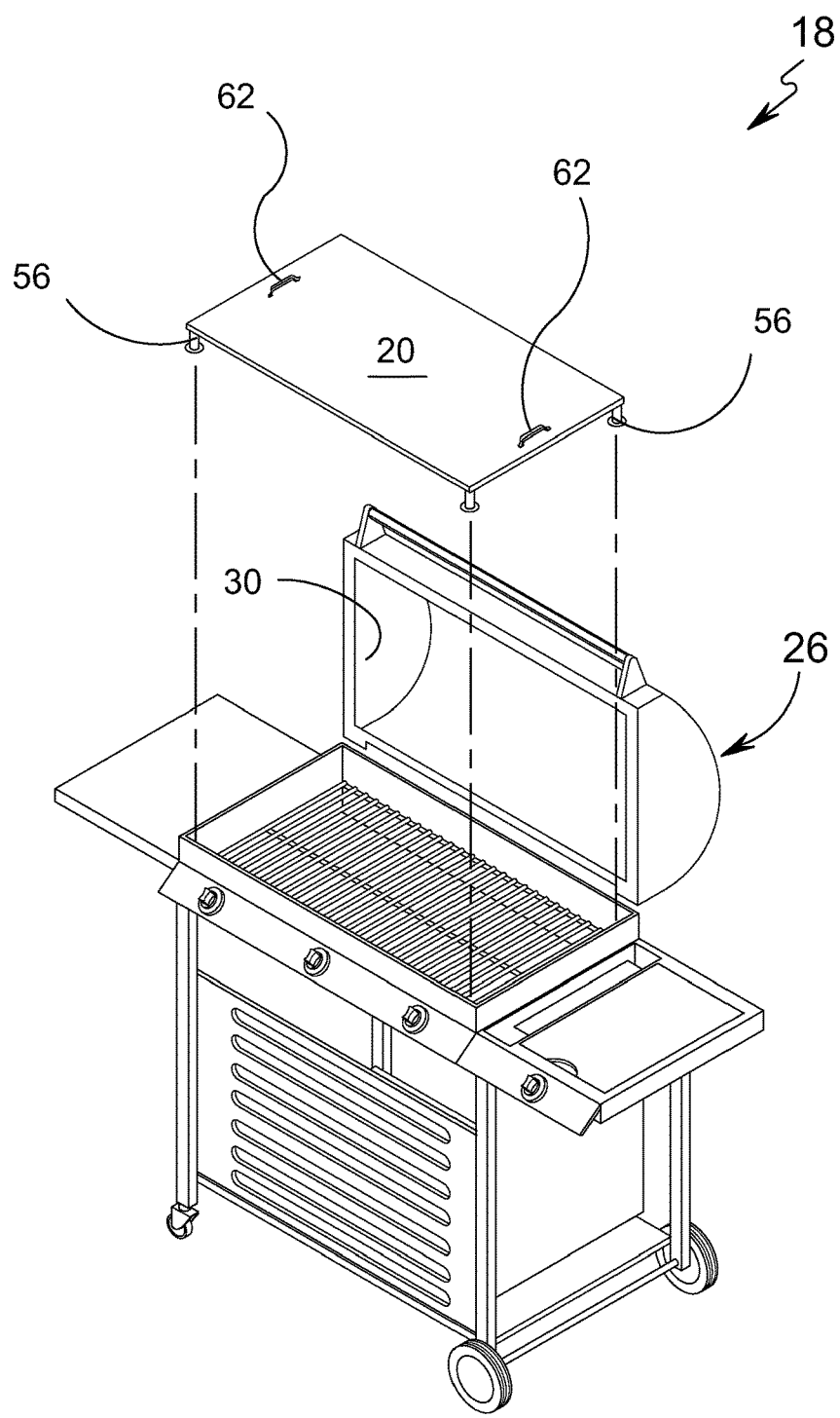
FIG. 9 is an illustrative view of an alternative body of the invention where the burnoff plate is provided with support legs to maintain it at a desired distance above the grill for cleaning.

Referring to FIG. 9, an alternative embodiment of the present invention is seen. In this embodiment, the burnoff plate 20 is provided with a plurality of support legs indicated at 56. These legs are dimensioned such that the burnoff plate 20 is held at a predetermined distance above the grill surface 12 so that the heat from the firebox is concentrated to clean the residue 14 (seen in FIG. 1) from the surface 12.

Thus in use, the present invention allows the user to clean the grill body 12 by positioning a burnoff plate 20 over it, concentrating the heat from the firebox portion 58 onto the grill member 12 and burning off the food/cooking residue 14, seen in FIG. 1. The burnoff plate 12 may be placed in the desired position by means of either a slot 34 in the firebox wall or by integral legs 56 seen in FIG. 9.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A barbeque stove where the stove includes a firebox having an inner firebox plenum and an outside firebox surface, a hinged hood portion having an inner hood plenum and an outer hood surface, and a grill body located generally between the firebox portion and the hinged hood portion, said barbeque stove comprising:
   a burnoff plate sized to substantially cover the grill body; said burnoff plate comprising at least one handle member configured to protrude laterally from a side of said burnoff plate;
   a slot formed in a side of the firebox plenum, with a bottom of said slot positioned adjacent to the grill body and a top of said slot positioned above the grill body; a length of said slot sized to receive said burnoff plate therethrough;
   a plurality of flanges configured to protrude into the firebox plenum, each of said plurality of flanges configured to support said burnoff plate to be positioned proximate to the grill body, but displaced therefrom;
   a flap pivotally mounted to the firebox plenum to pivot between a first position that covers and inhibits fluid communication through said slot, and a second position that permits insertion of said burnoff plate through said slot;
   wherein said burnoff plate is configured to be installed through said slot using said at least one handle member to be supported in a predetermined position between the grill body and the inner hood plenum such that heat is concentrated between the firebox and said burnoff plate and surrounds the grill body to promote oxidation to incinerate food residue on the grill body; and
   wherein said plurality of flanges are configured to support said burnoff plate at a position being approximately one inch above the grill body.

2. The barbeque stove as claimed in claim 1 further comprising a storage receptacle formed in the firebox, said storage receptacle configured to receive said burnoff plate therein.

3. The barbeque stove as claimed in claim 1 where said burnoff plate is made of a material that reflects heat.

4. The barbeque stove as claimed in claim 1 where said burnoff plate is made of cast iron.

5. The barbeque stove as claimed in claim 1 where said burnoff plate is made of aluminum.

6. The barbeque stove as claimed in claim 1 where said burnoff plate is made of bonded copper and aluminum.

7. A barbeque grill comprising:
   a base;
   a barbecue grating supported proximate to an upper portion of said base;
   a burnoff plate sized to cover an entirety of said barbeque grating; said burnoff plate comprising at least one handle member configured to protrude laterally from a side of said burnoff plate;

a slot formed in a side of said base, with a bottom of said slot positioned adjacent to said barbecue grating and a top of said slot positioned above said barbecue grating; a length of said slot being sized to receive said burnoff plate therethrough;

a flap pivotally mounted to said base to pivot between a first position that covers said slot to inhibit fluid communication through said slot, and a second position that permits insertion of said burnoff plate through said slot;

one or more flanges configured to protrude into an interior of said base, each of said one or more flanges configured to support said burnoff plate to be positioned above and proximate to the barbecue grating, but being displaced therefrom, to promote oxidation of food residue on the grating by trapping and reflecting heat to surround the grating; and wherein said one or more flanges are configured to support said burnoff plate approximately one inch above said barbecue grating.

8. The barbeque grill as claimed in claim 7 further comprising a storage receptacle formed in said base, said storage receptacle configured to house said burnoff plate.

9. The barbeque grill as claimed in claim 8 where said burnoff plate is made of a material that reflects heat.

* * * * *